United States Patent
Edwards et al.

(10) Patent No.: US 7,363,508 B2
(45) Date of Patent: Apr. 22, 2008

(54) SYSTEM AND METHOD FOR DYNAMICALLY ENABLING COMPONENTS TO IMPLEMENT DATA TRANSFER SECURITY MECHANISMS

(75) Inventors: W. Keith Edwards, San Francisco, CA (US); Mark W. Newman, San Francisco, CA (US); Jana Z. Sedivy, Palo Alto, CA (US); Diana K. Smetters, San Francisco, CA (US); Trevor Smith, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 658 days.

(21) Appl. No.: 10/442,582

(22) Filed: May 21, 2003

(65) Prior Publication Data

US 2004/0236943 A1    Nov. 25, 2004

(51) Int. Cl.
*G06F 11/30* (2006.01)
(52) U.S. Cl. .............. 713/189; 713/161; 713/164; 713/167; 713/193; 726/2; 726/3; 726/6; 726/30; 709/225; 709/226; 709/229
(58) Field of Classification Search .......... 713/161, 713/189, 193, 164, 167; 726/2, 3, 6, 30; 709/225, 226, 229
See application file for complete search history.

(56) References Cited

U.S. PATENT DOCUMENTS

| | | | |
|---|---|---|---|
| 6,070,245 A * | 5/2000 | Murphy et al. ............... 726/3 |
| 6,574,609 B1 * | 6/2003 | Downs et al. ............... 705/50 |
| 6,697,824 B1 * | 2/2004 | Bowman-Amuah ......... 709/229 |
| 6,816,596 B1 * | 11/2004 | Peinado et al. ............. 380/277 |
| 7,194,543 B2 * | 3/2007 | Robertson et al. .......... 709/226 |
| 2002/0108050 A1 * | 8/2002 | Raley et al. ................ 713/193 |
| 2002/0141582 A1 | 10/2002 | Kocher et al. |
| 2003/0167410 A1 * | 9/2003 | Rigstad et al. ............... 713/201 |

OTHER PUBLICATIONS

Kocher, P. et al., "Self-Protecting Digital Content—A Technical Report From the CRI Content Security Research Initiative," Cryptography Research, Inc., pp. 1-3, (2003) [Retrieved from the internet at http://www.cryptography.com/resources/Whitepapers/SelfProtectingContent_sum.pdf on May 13, 2003].
[Author Unknown] "Crytography Research Study Concludes Risk Mangement Key to Controlling Piracy of Digital Media," Corman Communications, pp. 1-3, (2003).
Markoff, J., "Technology: Plan Would Use Content, Not Devices, to Fight Piracy," The New York Times (2003), [Retrieved from the Internet at http://query.nytimes.com/search/restricted/article?res=R40D16F83B5FOC768DDDAD089 . . . on May 20, 2003].

* cited by examiner

*Primary Examiner*—Kim Vu
*Assistant Examiner*—Beemnet W Dada
(74) *Attorney, Agent, or Firm*—Park, Vaughan & Fleming LLP

(57) ABSTRACT

A system and method for implementing data transfer security mechanisms. The method includes a first component transferring a data type handler object to a second component. The second interface invokes an interface accessible through the date type handler object which includes instructions that are executed by the second component to implement a data transfer security mechanism. Further, the data type handler interface can be encrypted, include cryptographic keys, and/or include digital signatures.

36 Claims, 9 Drawing Sheets

FIG. 6
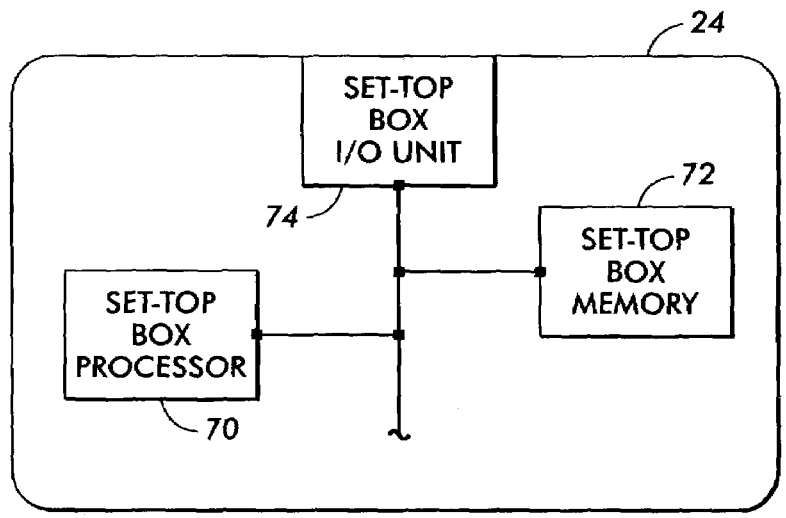
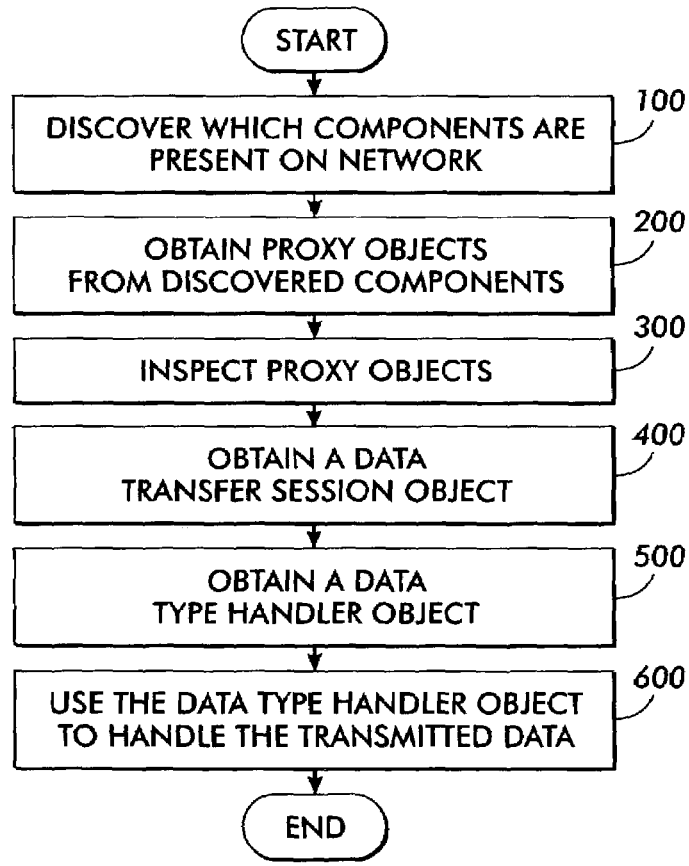
FIG. 7

FIG. 12
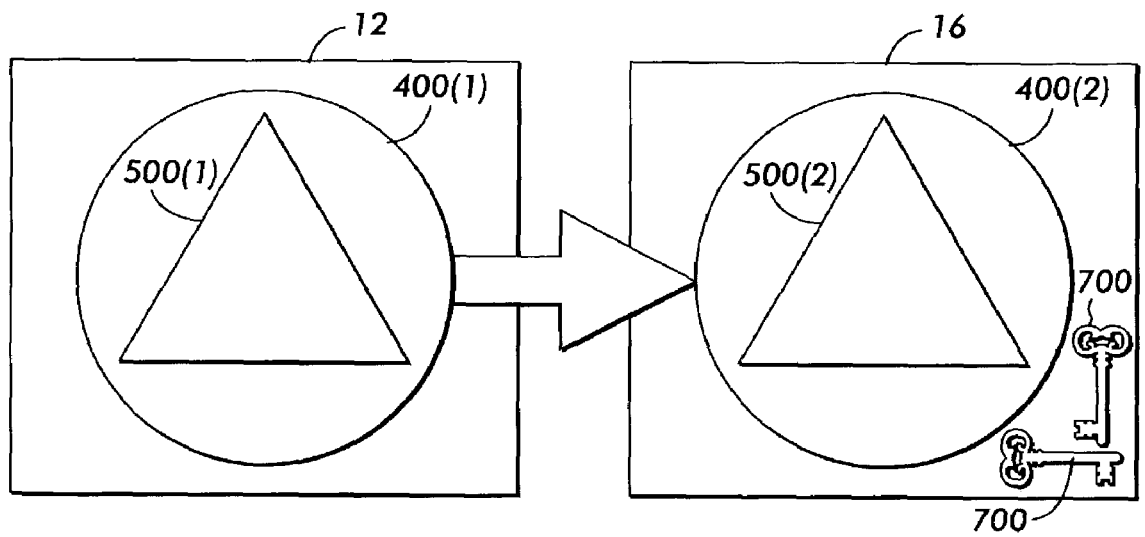
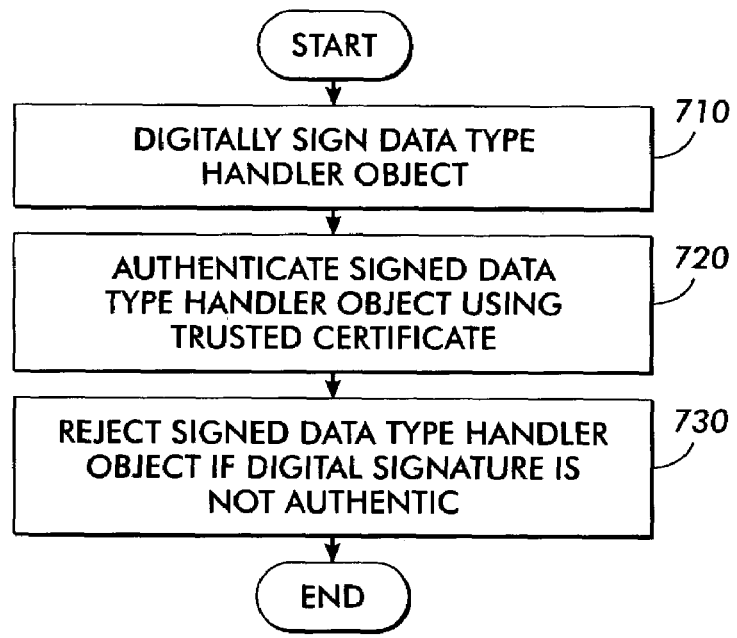
FIG. 13

SYSTEM AND METHOD FOR DYNAMICALLY ENABLING COMPONENTS TO IMPLEMENT DATA TRANSFER SECURITY MECHANISMS

FIELD

This invention relates generally to communication methods and systems, and, more particularly, to a method and system for handling data at one of a plurality of arbitrary components which is received from another one of the plurality of components using data type handler objects, and a system and method using cryptographic techniques in connection with the data type handler objects to implement data transfer security mechanisms.

BACKGROUND

In a networked setting, components, such as devices, services and/or applications, may need to exchange data. A few of these components may be able to essentially accept and provide arbitrary types of data without restriction. For example, a file server might accept data in any format for storage in a file, since it does need to understand/parse/use the actual contents to store them.

However, many components must be able to understand the data types they receive in order to function properly. For example, a printer may only understand a Postscript data type format, or a projector may only understand GIF data type formats. But, if the printer does not receive data in a Postscript format, or the projector does not receive data in a GIF format, then the printer can not print and the projector can not display the received data.

As a result, compatibility is limited to a set of fixed data types that a particular sender can provide and a particular receiver can understand and use. Typically, changing this fixed set of data types for the senders and receivers of data requires rewriting the components to be able to process the new data types. For example, the printer would need to be reprogrammed to handle a new type of data, such as PDF, or the data sender would need a filter or translation mechanism installed ahead of time that can convert the data before sending it to the printer. These conversions will work, but unfortunately the data sender, such as a computer, or the data recipient, such as the printer, will have to be pre-programmed as described above or the data transfer will fail.

Further, some data types may be protected using security features that are unknown to a potential receiver. For example, video content may be encrypted using a variety of cryptographic techniques. To be able to display this video content, a receiver must have knowledge of both the cryptographic algorithm used to encrypt the content, as well as the key(s) used to encrypt the content. Without this knowledge, the receiver would be unable to display or otherwise use such encrypted video content from a sender. Beyond simple encryption, however, a sender of data may desire protecting this data using any number of content protection techniques. For instance, it may wish to allow the data to only be usable by certain potential receivers, or allow that only certain operations can be done to received data.

SUMMARY

A system in accordance with embodiments of the present invention includes an interface system on a first component that communicates with a data type handler module. The interface system accesses at least one interface provided by the data type handler module. A security system accesses at least one interface provided by the data type handler module to obtain a data transfer security mechanism. Further, the security system implements the data transfer security mechanism.

A method and computer readable medium in accordance with embodiments of the present invention include communicating with a data type handler module, accessing at least one interface provided by the data type handler module to obtain a data transfer security mechanism, and implementing the data transfer security mechanism.

The embodiments of the present invention provide a number of benefits, such as providing data type handler objects to components that enable the components to be dynamically extended to handle new data types that the component was not natively programmed to understand. Further, the embodiments of the invention advantageously use various cryptographic techniques in connection with these data type handler objects to implement security mechanisms and protocols and/or for ensuring secure handling of data. Additionally, the embodiments allow components to participate in new types of digital rights management schemes or broadcast keying protocols without requiring that the components be explicitly reprogrammed.

BRIEF DESCRIPTION OF THE DRAWINGS

FIGS. 2-6 are block diagrams of one or more components used in the system shown in FIG. 1;

FIG. 7 is a flow chart of a process for handling data in accordance with embodiments of the present invention;

FIGS. 11 and 12 are functional block diagrams of portions of a system for implementing data transfer security mechanisms in accordance with embodiments of the present invention;

FIG. 13 is a flow chart of a portion of a process for implementing data transfer security mechanisms in accordance with embodiments of the present invention.

DETAILED DESCRIPTION

Figure 1:
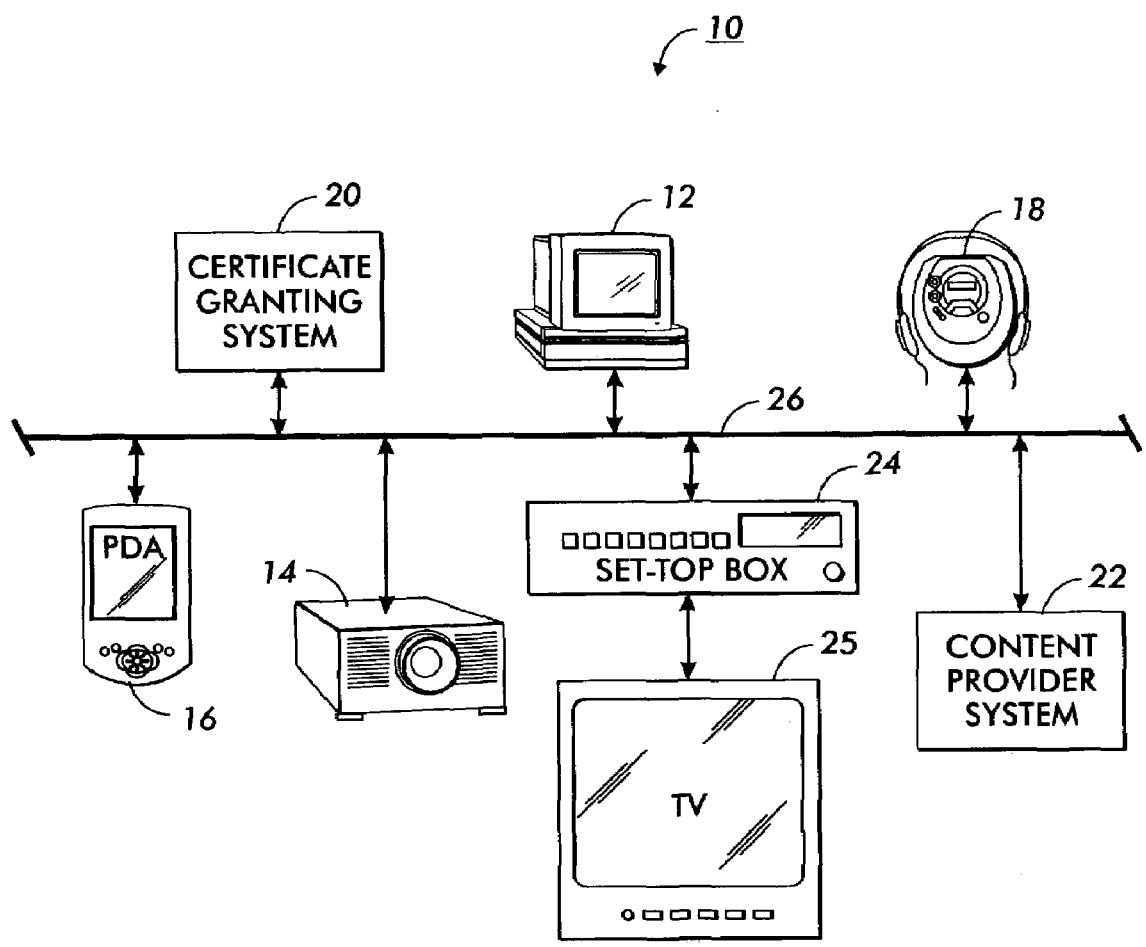
FIG. 1 is a diagram of a system for handling and/or implementing data transfer security mechanisms in accordance with embodiments of the present invention.

A system 10 and methods for handling data and implementing data transfer security mechanisms in accordance with embodiments of the present invention are illustrated in FIGS. 1, 7, 10 and 13. The system 10 includes a computer 12, projector 14, personal digital assistant ("PDA") 16, audio player 18, certificate granting system 20, content provider system 22, set-top box 24 and a television ("TV") 25, although the system 10 may include a fewer or greater number of components. The embodiments of the present invention provide components with dynamic extensibility not just to new data formats, but also to new encryption mechanisms, digital rights management systems, and other secure content delivery mechanisms.

Referring to FIG. 1, the components in system 10, such as computer 12, projector 14, PDA 16, audio player 18, certificate granting system 20, content provider system 22, set-top box 24 and TV 25, are communicatively coupled together by the network 26. Further, the particular types of components described herein in connection with system 10 are provided for exemplary purposes only. These exemplary components may comprise any type of device or system that can store, process and execute instructions for performing one or more methods of the present invention as will be described in further detail herein, although the components may also comprise executable programs or other types of software entities that may be executed by or reside in a memory of a device or system. By way of example only, the components shown in FIG. 1 may also comprise scanners, lap-top computers, cellular telephones, display devices, video input/output devices, audio input/output devices, copier devices, printer devices, remote control devices, appliances and file systems or databases residing in a computer system.

Further, the components in system 10 each have stored in their respective memories programming to understand the semantics of a basic set of universal interfaces associated with proxy objects and their associated operations, instructions and data, which will be described in further detail herein, although one or more of the components in some embodiments do not necessarily require using the basic set of universal interfaces and their associated proxy objects. The particular universal interfaces used are responsive to the needs of applications for particular services, such as for sending graphic files to a display device, such as projector 16, for display, or sending a file being operated on by a word processing program to a printer device, for example. However, the basic semantic programming does not need to include the particulars of the specific services involved, only the semantics of the universal interfaces used in embodiments of the present invention as described further herein below.

Thus, one or more of the components in the system 10 has stored in their respective memories and implements, or otherwise has access to ("associated with"), a data source and/or a data sink interface, although each component may also implement a variety of other interfaces, such as a contextual interface, a notification interface and a user interface, as disclosed in U.S. patent application Ser. No. 09/838,933 to Edwards et al., titled "SYSTEM AND METHOD FOR ENABLING COMMUNICATION AMONG ARBITRARY COMPONENTS," filed Apr. 20, 2001, which has already been incorporated herein by reference in its entirety.

Figure 2:
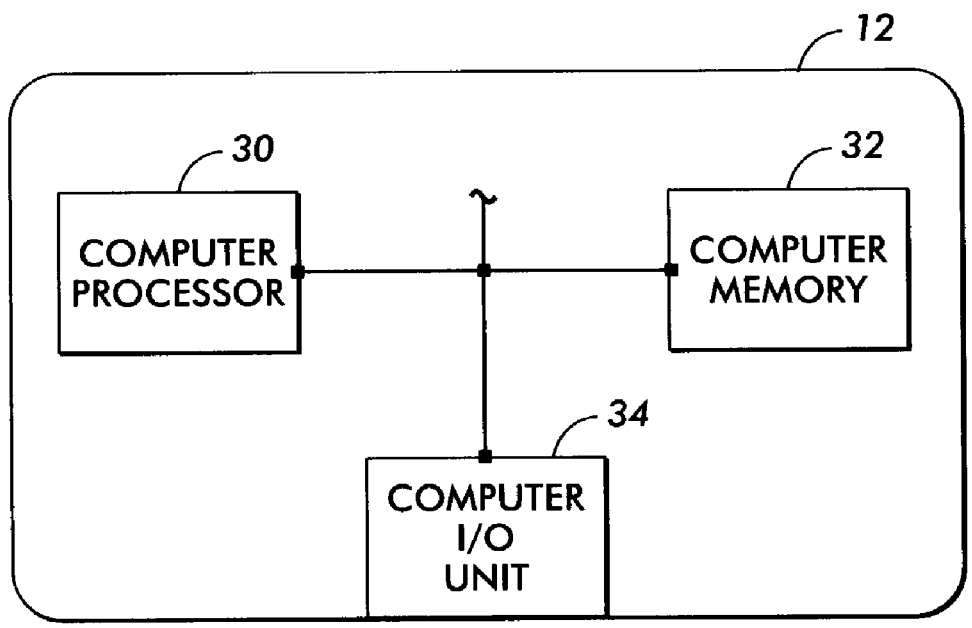

Referring to FIG. 2, the computer 12 includes a computer processor 30, a computer memory 32 and a computer I/O unit 34, which are coupled together by one or more bus systems or other communication links, although the computer 12 can comprise other elements in other arrangements. The computer processor 30 executes at least a portion of the programmed instructions for handling data and/or implementing data transfer security mechanisms in accordance with embodiments of the present invention as described herein and as set forth in FIGS. 7, 10 and 13. These programmed instructions are stored in the computer memory 32 for execution by the computer processor 30.

The computer memory 32 comprises any type of fixed or portable memory accessible by the computer processor 30, such as ROM, RAM, SRAM, DRAM, DDRAM, hard and floppy-disks, CDs, DVDs, magnetic tape, optical disk, ferroelectric and ferromagnetic memory, electrically erasable programmable read only memory, flash memory, charge coupled devices, smart cards, or any other type of computer-readable media. The computer memory 32 is used to store these programmed instructions as well as other information, although the instructions may be stored elsewhere. The computer I/O unit 34 is used by the computer 12 to operatively couple and communicate with other components, such as the projector component 14 and the set-top box 24, over the network 26.

Figure 3:
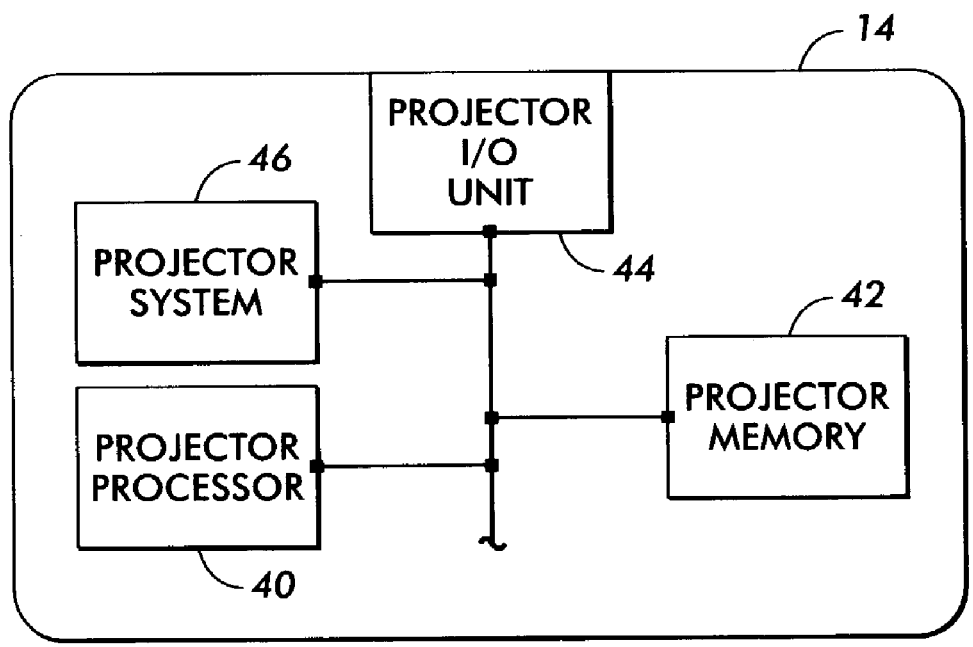

Referring to FIG. 3, the projector 14 includes a projector processor 40, a projector memory 42, a projector I/O unit 44 and a projection system 46, which are coupled together by one or more bus systems or other communication links, although the projector 14 can comprise other elements in other arrangements, such as having one or more of the projector processor 40, projector memory 42, and the projector I/O unit 44 located externally to the projector 14. The projector 14 can project images using the projection system 46, such as text and/or graphics, onto a fixed medium, such as a projection screen, although the projector 14 could have other functions. The projector processor 40 executes at least a portion of the programmed instructions for handling data and/or implementing data transfer security mechanisms in accordance with embodiments of the present invention as described herein and as set forth in FIGS. 7, 10 and 13. These programmed instructions are stored in the projector memory 42 for execution by the projector processor 40.

The projector memory 42 is the same type of memory as the computer memory 32 used by the computer 12. The projector memory 42 can be used to store these programmed instructions as well as other information, although the instructions may be stored elsewhere. The projector I/O unit 44 is used by the projector 14 to operatively couple and communicate with other components, such as the computer 12, over the network 26.

Figure 4:
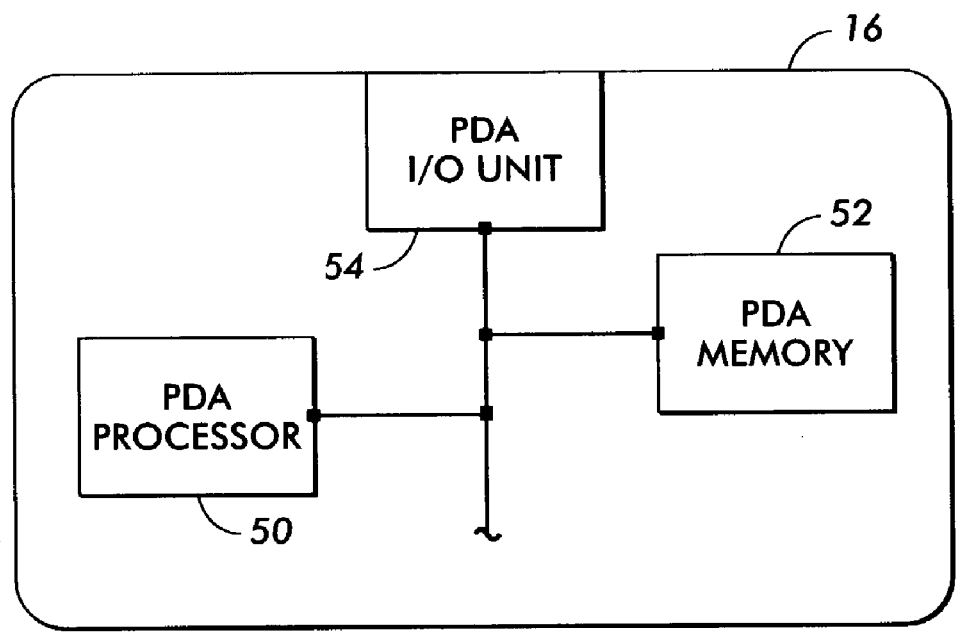

Referring to FIG. 4, PDA 16 includes a PDA processor 50, a PDA memory 52 and a PDA I/O unit 54, which are coupled together by one or more bus systems or other communication links, although the PDA 16 can comprise other elements in other arrangements. The PDA 16 performs a variety of functions such as information display, electronic messaging, telephony, facsimile transmissions or networking, although the PDA 16 may perform other functions. The PDA processor 50 executes at least a portion of the programmed instructions for handling data and/or implementing data transfer security mechanisms in accordance with embodiments of the present invention as described herein and as set forth in FIGS. 7, 10 and 13. These programmed instructions are stored in the PDA memory 52 for execution by the PDA processor 50.

The PDA memory 52 is the same type of memory as the computer memory 32 used by the computer 12. The PDA memory 52 can be used to store these programmed instructions as well as other information, although the instructions may be stored elsewhere. The PDA I/O unit 54 is used by the PDA 16 to operatively couple and communicate with other components, such as the computer 12 and the projector 14, over the network 26.

Figure 5:
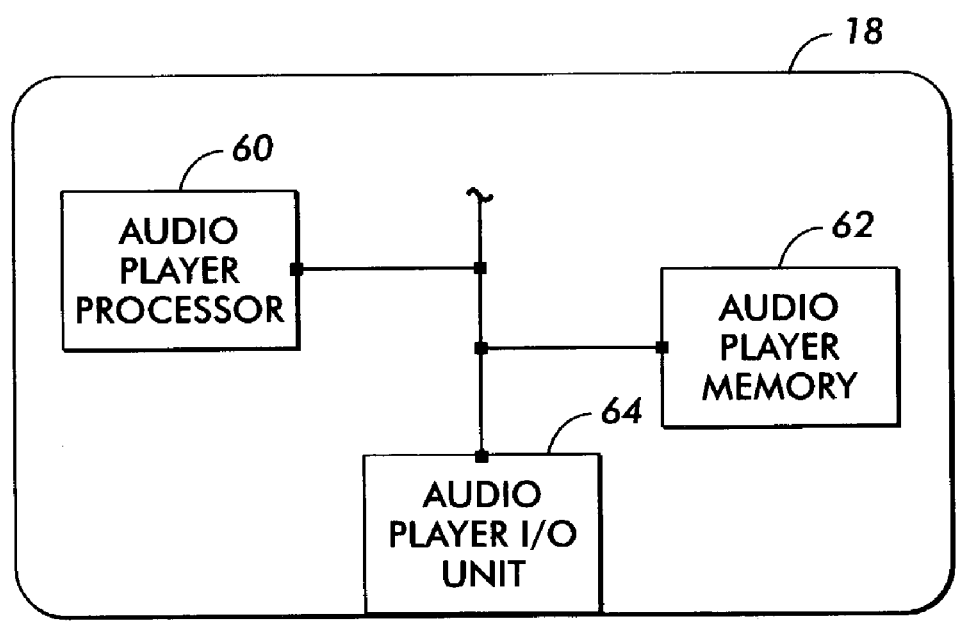

Referring to FIG. 5, the audio player 18 includes an audio player processor 60, audio player memory 62 and an audio player I/O unit 64, which are coupled together by one or more bus systems or other communication links, although the audio player 18 can comprise other elements in other arrangements. The audio player 18 stores and plays digital audio files, such as MP3 files, although the player 18 may store and play other types of audio and non-audio file formats, such as WAV or AVI file formats and may perform other functions. Further, the audio player 18 may access the audio files stored at other locations, such as the computer 12. The audio player processor 60 executes at least a portion of the programmed instructions for handling data and/or implementing data transfer security mechanisms in accordance with embodiments of the present invention as described herein and as set forth in FIGS. 7, 10 and 13. These programmed instructions are stored in the audio player memory 62 for execution by the audio player processor 60.

The audio player memory 62 is the same type of memory as the computer memory 32 used by the computer 12. The audio player memory 62 can be used to store these programmed instructions as well as other information, although the instructions may be stored elsewhere. The audio player I/O unit 64 is used by the audio player 18 to operatively couple and communicate with other components, such as the computer 12 and the projector 14, over the network 26.

Referring back to FIG. 1, the certificate granting system 20 comprises a credential issuing authority infrastructure, such as VeriSign®, that issues and manages security credentials, such as digital certificates and public keys for the encryption and decryption of content, such as data and electronic documents, for example, as part of a public key infrastructure ("PKI"). Further, the certificate granting system 20 has access to the network 26 and can issue credentials to one or more components on the network 26, such as the computer 12, for example. Since certificate granting systems 20 are well known in the art, the specific elements, their arrangement within the system 20 and operation will not be described in detail herein.

The content provider system 22 comprises a service infrastructure, such as a cable television provider, which includes one or more computer systems. The computer systems each may include a processor, memory and an I/O unit for accessing the network 26, although the content service provider system 22 does not need access to the network 26 to communicate with components in system 10, such as the set-top box 24 and/or the TV 25. The content provider system 22 broadcasts electromagnetic waves, such as television video and audio content, to one or more recipients, although other forms of distribution may be used, such as multicast, and other types of content may be distributed, such as text files, e-books, video and audio format files, multimedia, pictures, executable code, software or any combination thereof. Further, the content provider system 22 may broadcast the television video and audio content in other forms besides electromagnetic waves, such as digital signals.

In embodiments of the present invention, the content provider system 22 encrypts the content to prevent unauthorized reception. As mentioned above, the content provider system 22 has access to the network 26, and can therefore distribute content to one or more components on the network 26, such as the set-top box 24, for example, although again, access to the network 26 is not necessary. Since content provider systems are well known in the art, the specific elements, their arrangement and operation will not be described in detail herein.

Referring to FIG. 6, the set-top box 24 includes a set-top box processor 70, a set-top box memory 72 and a set-top box I/O 74, which are coupled together by one or more bus systems or other communication links, although the box 24 can comprise other elements in other arrangements, such as having one or more of the set-top box processor 70, set-top box memory 72 and the set-top box I/O 74 located externally to the set-top box 24. The set-top box 24 performs a variety of functions, such as receiving and decoding electromagnetic waves representing television broadcasts, although the box 24 may receive and decode multicasts and may perform other functions, such as videoconferencing, home networking, IP telephony, video-on-demand and high-speed Internet TV services, and receive and decode other types of content.

Further, the set-top box 24 can receive and decode broadcasts in other forms besides electromagnetic waves, such as digital signals. The set-top box processor 70 executes at least a portion of the programmed instructions for handling data and/or implementing data transfer security mechanisms in accordance with embodiments of the present invention as described herein and as set forth in FIGS. 7, 10 and 13. These programmed instructions are stored in the set-top box memory 72 for execution by the set-top box processor 70.

The set-top box memory 72 is the same type of memory as the computer memory 32 used by the computer 12. The set-top box memory 72 can be used to store these programmed instructions as well as other information, although the instructions may be stored elsewhere. The set-top box I/O unit 74 is used by the set-top box 24 to operatively couple and communicate with other components, such as the computer 12, over the network 26, although the box 24 may be operatively coupled directly to other components, such as TV 25. Further, the set-top box I/O unit 74 is capable of receiving broadcast signals, such as electromagnetic waves, sent from components, such as the content provider system 22, although the I/O unit 74 may also be able to receive multicast signals and digital signals.

Referring back to FIG. 1, the TV 25 comprises a device that can receive electromagnetic waves representing television broadcasts having video and/or audio content, convert the waves into images and sound, and present the converted images on a display screen and output the sound through one or more audio speakers, although the TV 25 may display images and output sound converted from multicasts and/or digital signals. Further, the TV 25 is coupled to the set-top box 24 and can receive decoded audio and video content from the box 24 for presentation by the TV 25. Since devices, such as TV 25, are well known in the art, the specific elements, their arrangement within the TV 25 and operation will not be described in detail herein.

The network 26 enables components in the system 10, such as the computer 12, projector 14, PDA 16, audio player 18, certificate granting system 20, content provider system 22 and set-top box 24, to communicate with each other and any other components with access to network 26 using a TCP/IP protocol, although other protocols may be used. In embodiments of the present invention, the network 26 comprises the Internet, although other types of networks 26 may be used, such as Intranets (e.g., LANs, WANs), and telephone line, coaxial cable, wireless and ISDN networks 26, and combinations thereof.

A portion of the operation for system 10 to handle data in accordance with embodiments of the present invention will now be described with reference to FIGS. 1-3 and 7-9. By way of example only, a user at the computer 12 may desire presenting slides stored in files for a slide show presentation, such as MS PowerPoint™. Further, the user at the computer 12 may desire using a suitable device, such as the projector 14, for presenting the show to a group of users. Thus, the computer 12 is configured to generate appropriate user interfaces and to respond to user input for beginning execution of the slide show presentation and other events as described further herein with respect to steps 100-600.

Accordingly, and referring to FIG. 7 at step 100, the computer 12 performs a discovery process in response to receiving user input expressing a desire to use projector 14 for presenting the show. By performing the discovery process, the computer 12 determines which components are present on the network 26, what their data transfer capabilities are, and what their native data types are. Computer 12 is programmed to automatically perform the discovery process upon the user expressing a desire to establish a particular type of communication as mentioned above, such as data transfer where computer 12 desires transferring stored slides to a projector 14 for display, although the computer 12 may be programmed in other manners, such as to allow the user to manually initiate the discovery process.

In embodiments of the present invention, computer 12 discovers projector 14 using a Jini™ system discovery protocol system, although a number of other discovery protocols may be used, such as Bluetooth™ SLP, UDDI or a look-up process, as disclosed in U.S. patent application Ser. No. 10/058,268 to Edwards et al., titled "SYSTEM AND METHOD FOR ENABLING ARBITRARY COMPONENTS TO TRANSFER DATA BETWEEN EACH OTHER," filed Jan. 29, 2002, which is incorporated herein by reference in its entirety.

Computer 12 may display the discovered components (not illustrated), as disclosed in U.S. patent application Ser. No. 10/212,377 to Edwards et al., titled "SYSTEM AND METHOD FOR ENABLING COMPONENTS ON ARBITRARY NETWORKS TO COMMUNICATE," filed Aug. 1, 2002, which is incorporated herein by reference in its entirety, and the user may select the components desired to be involved in the data transfer, although computer 12 may be programmed to automatically select the components based upon a number of criteria, such as component availability or the physical location of the components in network 26.

At step 200, the projector 14 returns a projector proxy object to the computer 12, which is stored in the computer memory 32. The projector proxy object can provide a list of the data types in which it, and hence the projector 14, can receive and understand data. The list is provided in a MIME format, although other formats may be used, such as generic text strings. The projector proxy object also provides a list of one or more "data type handler" interfaces associated with the projector 14 and that the projector 14 may accept and execute. Further, the projector proxy object also implements one or more universal interfaces associated with the projector 14, which are accessible to the computer 12, such as the data sink interface, as disclosed in U.S. patent application Ser. No. 09/838,933 to Edwards et al., titled "SYSTEM AND METHOD FOR ENABLING COMMUNICATION AMONG ARBITRARY COMPONENTS," filed Apr. 20, 2001, which has already been incorporated herein by reference.

In embodiments of the present invention, the projector proxy object, its associated operations, instructions and interfaces, as well as any other proxy objects, interfaces, operations and instructions that may be subsequently described herein, comprise mobile code, such as JAVA, although other languages may be used, such as C++, Smalltalk, CLOS, Ada or Object Pascal. Mobile code is executable data, such as object oriented code, which can be transmitted to components, such as computer 12, projector 14, PDA 16, audio player 18 and set-top box 24, where it is executed as described herein, although other types of programming methodologies may be used such as procedural-oriented (e.g., Pascal, C), logic-oriented, rule-oriented or constraint oriented.

At step 300, the computer 12 inspects the projector proxy object to determine which data type handler interfaces and data types can be accepted and understood by the projector 14. By way of example only, the computer 12 examines the list of data type handler interfaces and data types provided in the proxy object by the projector 14, described above in connection with step 200. In this example, the computer 12 determines that the projector 14 has been programmed to understand the semantics of a "viewer" data type handler interface. Thus, the projector 14 may accept, understand and execute mobile code instructions that may be provided by another component, such as computer 12, that implements the viewer interface. Moreover, the computer 12 determines that in addition to the viewer data type handler interface, the projector 14 can also understand data provided in a JPEG data type format.

Further in this example, the computer 12 can provide mobile code that implements the viewer data type handler interface, and can also provide data in an MS PowerPoint™ data type format. Although a viewer data type handler interface is used in this example, the computer 12 can provide, and the projector 14 can accept and implement, other types of data type handler interfaces, such as an "editor" data type handler interface that can modify received data in certain formats, a "printer" data type handler interface that can be used by a component to render a data type on a printer, and a "converter" data type handler interface that changes data from one data type to another.

The computer 12 also determines that the projector 14 is associated with at least the data sink interface, as described in U.S. application Ser. No. 09/838,933 to Edwards et al., titled "SYSTEM AND METHOD FOR ENABLING COMMUNICATION AMONG ARBITRARY COMPONENTS," filed Apr. 20, 2001, which again, has already been incorporated herein by reference. Thus, the projector 14 at least has the capability to receive data provided by a component having access to its data sink interface. As mentioned earlier, the computer 12 in this example understands the semantics of data sink interfaces, such as the data sink interface in general associated with the projector 14, and thus can invoke the interface to establish a data transfer session and provide the projector 14 with data.

Figure 8:
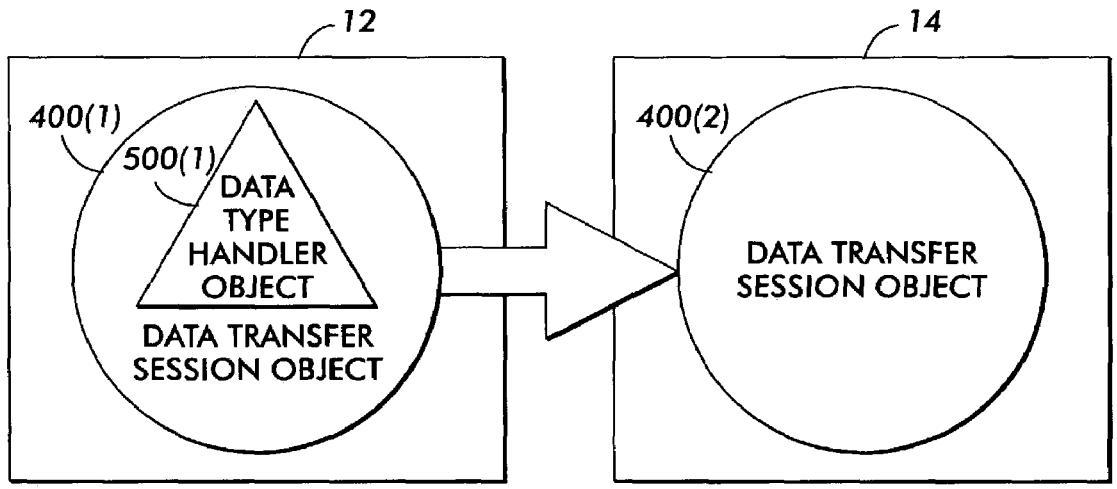
FIGS. 8 and 9 are functional block diagrams of portions of a system for handling data in accordance with embodiments of the present invention.

Accordingly, at step 400, the computer 12 creates a data transfer session object 400(1) and invokes the data sink interface associated with the projector 14, passing the session object 400(1) into the interface call. The projector 14 receives a data transfer session object 400(2) from the computer 12, which is a copy of the data transfer session object 400(1) as shown in FIG. 8. The data transfer session object 400(2) includes instructions, operations and data that are specific to the computer 12, yet may be understood and executed by the projector 14.

In response, the projector 14 executes one or more operations in the session object 400(2) to enable the projector 14 to retrieve the data from the computer 12. The instructions included in the data transfer session object 400(2) may also include instructions that when executed by the projector 14 instruct the projector 14 to request a copy of the viewer data type handler object 500(1) to handle the data. Thus, in this example the projector 14 requests a copy of the data type handler object 500(1).

Figure 9:
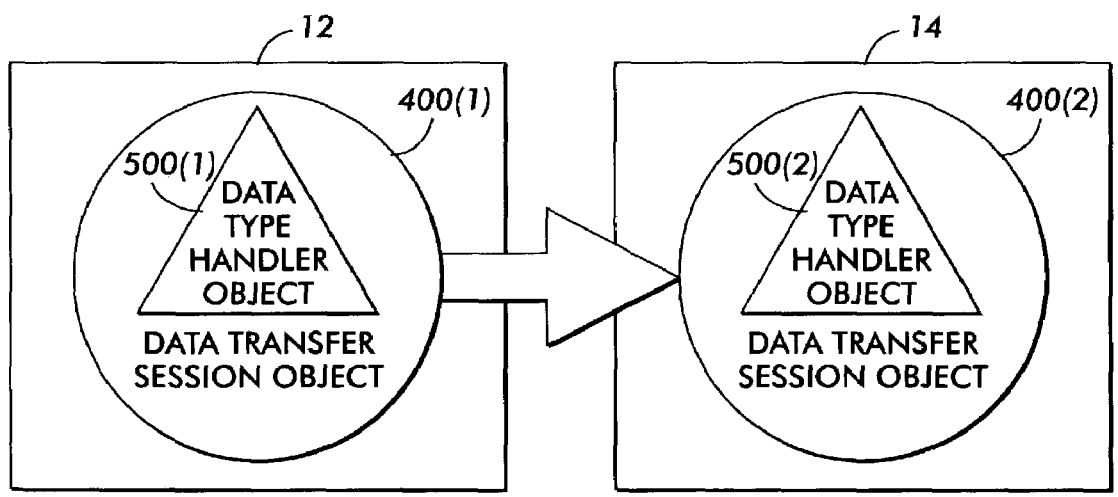

Accordingly, at step 500 and referring to FIG. 9, the projector 14 obtains data type handler object 500(2), which is associated with the data transfer session object 400(2) and thus accessible to the projector 14, although the projector 14 could obtain the data type handler object 500(2) from other sources, such as another component coupled to the network 26 or from the projector memory 42. The data type handler objects 500(1) and 500(2) are expressed in the data transfer session object 400(2) as tuples in the format "[native data type, interface]". In this example, the data transfer session object 400(2) may include the tuple "[application/powerpoint, com.PARC.Viewer]," which indicates that the data type handler objects 500(1) and 500(2) provide a specific implementation of the viewer interface that can be executed to view MS PowerPoint™ files.

Thus at step 600, the projector 14 begins receiving the MS PowerPoint™ data from the computer 12. The viewer data type handler interface that is accessible to the projector 14 through the data type handler object 500(2) includes data type handling instructions that enable the projector 14 to handle data types that are not native to the projector 14 during the data transfer, such as the MS PowerPoint™ files used in this example. Moreover, the viewer data type handler object 500(2) includes instructions that are particular to the computer 12, but that projector 14 may retrieve and execute for viewing MS PowerPoint™ slide data from the computer 12 to be projected. The projector 14 invokes the interface to handle the data, such as for projecting the images represented by the data.

As a result, even though the projector 14 in this example is initially programmed to understand only JPEG data types, with the data type handler object 500(2) the projector 14 may implement the viewer data type handler interface and execute the instructions to be able to interact with and process MS PowerPoint™ data to project the images represented by the data. Moreover, the data type handler object 500(2) may include instructions that cause the projector 14 to request controller objects from the computer 12 to control one or more aspects of the data transfer, as disclosed in U.S. patent application Ser. No. 10/212,376 to Edwards et al., titled "SYSTEM AND METHOD FOR CONTROLLING COMMUNICATION," filed Aug. 1, 2002, which is incorporated herein by reference in its entirety.

An alternative process for the operation of the system 10 to handle data in accordance with embodiments of the present invention will now be described with reference back to FIGS. 1-3 and 7-9. In this embodiment, steps 100-400 and 600 are performed as described above, but step 500 is not performed as explained herein. Instead of the projector 14 receiving a data type handler object 500(2) from the computer 12 as described above in connection with step 500, the data type handler object 500(2) is pre-installed in the projector 14, although the data type handler object 500(2) may be downloaded from another component on the network 26.

For instance, a system administrator ("SA") of the network 26 may remotely install the data type handler object 500(2) on the projector memory 42, and the data type handler object 500(2) is used as described above in connection with step 600, although the data type handler object 500(2) may be stored on a portable memory medium, such as a CD-ROM or a floppy disk. In this case, the portable memory medium may be read by the projector 14, or a device operatively coupled to the projector 14, to retrieve the data type handler object 500(2), which is then stored in the projector memory 42 to be used as described above in connection with step 600.

Another portion of the operation for system 10 to implement a data transfer security mechanism in accordance with embodiments of the present invention will now be described with reference to FIGS. 1-3, 7 and 10-11. In this example, data to be sent by the computer 12 are encrypted using public key cryptography and stored in the computer memory 32, although other cryptographic techniques may be used. Steps 100-500 are performed in the same manner described above, except as described herein. When the data type handler objects 500(1) and 500(2) are created by the computer 12 in this example, the computer 12 provides one or more appropriate cryptographic keys 700(1), although the computer 12 may also include in the objects 500(1) and 500(2) instructions for handling data not natively understood by the projector 14 as described above in connection with embodiments of the present invention.

Figure 10:
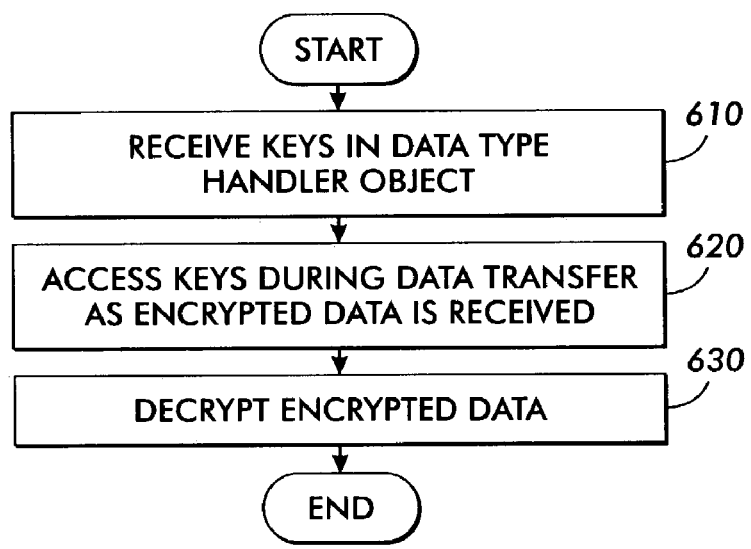
FIG. 10 is a flow chart of a portion of a process for implementing data transfer security mechanisms in accordance with embodiments of the present invention.
Figure 11:
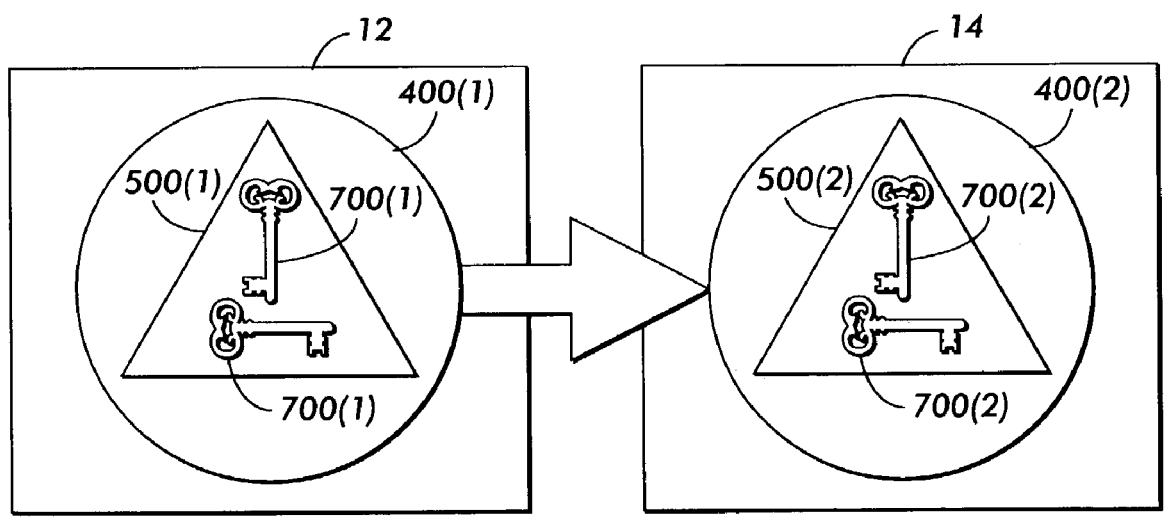

Accordingly and referring to FIGS. 10-11, at step 610, the data type handler object 500(2) is received by the projector 14 with the appropriate cryptographic keys 700(2).

At step 620, the projector 14 invokes the instructions in the data type handler object 500(2) through the interface provided to it by the object 500(2) and begins executing the instructions. Here, as the instructions are executed by the projector 14 it is instructed to use one or more of the cryptographic keys 700(2) to decrypt one or more portions of the data it is receiving from the computer 12. Further, the data type handler object 500(2) provides these cryptographic keys 700(2) to the projector 14 as they are needed.

At step 630, the projector 14 uses the cryptographic keys 700(2) as the data type handler object 500(2) instructions instruct the projector 14 to decrypt the encrypted data received from the computer 12, providing an encrypted channel for the exchange of data. Thereafter, step 600 is optionally performed by the projector 14 to handle data transmitted to it by the computer 12 as described above in connection with embodiments of the present invention.

An alternative process for the operation of the system 10 to implement a data transfer security mechanism in accordance with embodiments of the present invention will now be described with reference to FIGS. 1-2, 4, 7, 10 and 12. In this example, again, the files stored on computer 12 are encrypted using public key cryptography, although other cryptographic techniques may be used. Steps 100-500, 620-630, and optionally step 600, are performed in the same manner described above in connection with embodiments of the present invention, except the PDA 16 is substituted for the projector 14 and thus operates in place of the substituted projector 14. Further, and referring to FIG. 12, instead of the data type handler objects 500(1) and 500(2) having the cryptographic keys 700(1) and 700(2) as explained above in connection with step 610, the PDA 16 stores in a protected area of the PDA memory 52 one or more cryptographic keys 700 which it may need to decrypt encrypted data received from computer 12, although the keys 700 could be stored on another device or in another software entity on computer 12, for example.

Thereafter, steps 620-630 are performed as described above, except at step 620, the instructions that are executed by the PDA 16 instruct the PDA 16 to use one or more of the cryptographic keys 700 to decrypt one or more portions of the data it is receiving from the computer 12, and the executed instructions further request the keys 700 from the PDA 16. The keys 700 can be requested from the PDA 16 via communication over a TCP/IP protocol, although other protocols, such as SOAP, CORBA, RMI or combinations thereof, may be used. Further, the keys 700 may be requested through the use of a controller object added to the data transfer session by the data type handler object 500(2), as disclosed in U.S. patent application Ser. No. 10/212,376 to Edwards et al., titled "SYSTEM AND METHOD FOR CONTROLLING COMMUNICATION," filed Aug. 1, 2002, which has already been incorporated herein by reference.

The data type handler object 500(2) may request keys 700 from the PDA 16 from time to time as the data transferred from computer 12 is re-encrypted using different corresponding cryptographic keys. In response, PDA 16 retrieves from the PDA memory 52 the cryptographic keys 700 specified by the data type handler object 500(2) instructions as they are needed. At step 630, the PDA 16 decrypts and handles the data in the same manner described above.

An alternative process for the operation of the system 10 to implement a data transfer security mechanism in accordance with embodiments of the present invention will now be described with reference to FIGS. 1-2, 5, 7, 10 and 13-14. In this example, the data stored on computer 12 are optionally encrypted as described above in connection with other embodiments. Further, steps 100-400 are performed in the same manner described above, except the audio player 18 is substituted for the projector 14 and thus operates in place of the substituted projector 14. Also in this example, content or data, such as audio files, are sent from the computer 12 to the audio player 18 instead of the MS PowerPoint™ files that are described as being sent in other embodiments, although the data may be sent to the audio player 18 from the content provider system 22.

Figure 14:
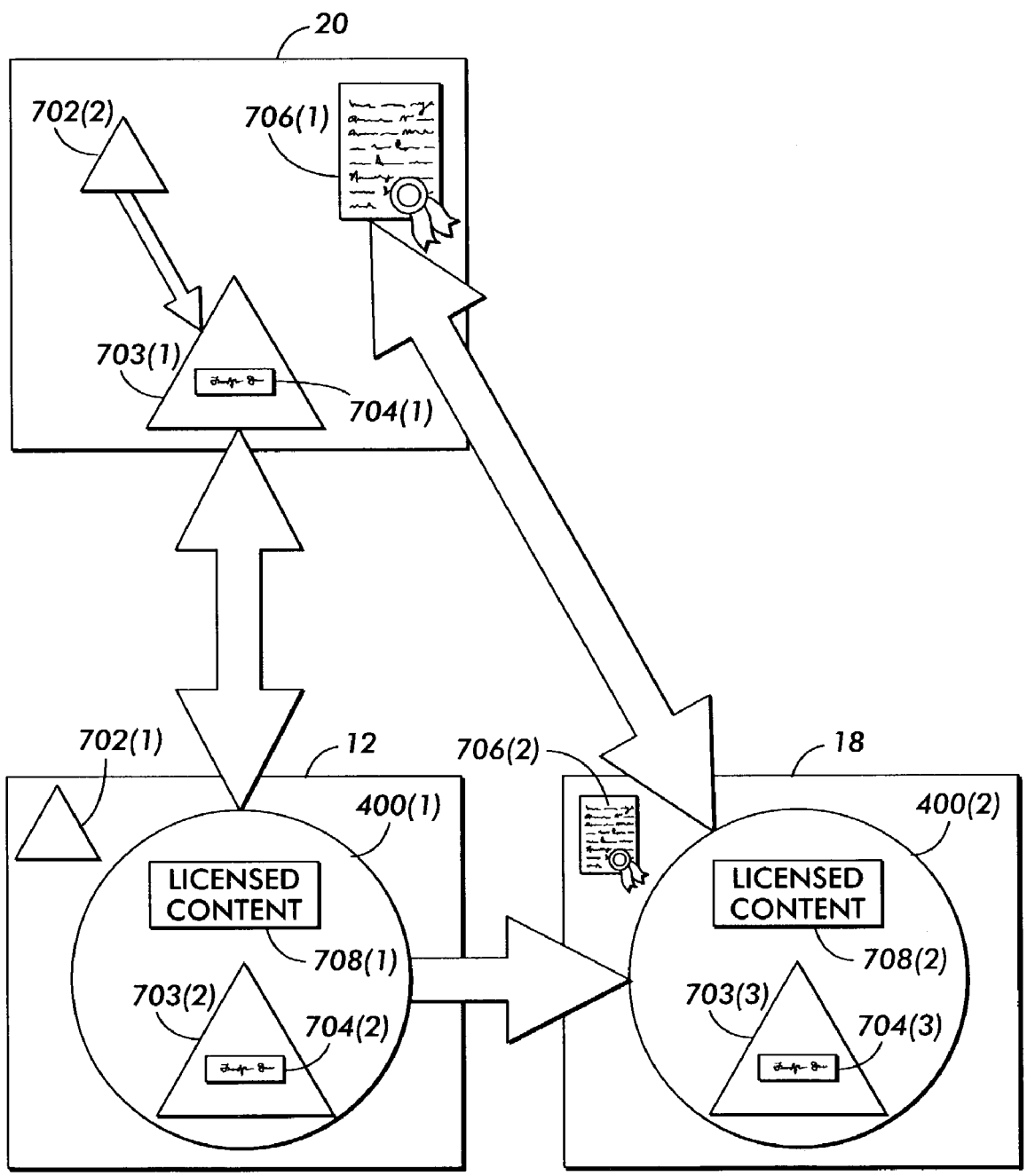
FIGS. 14 and 15 are functional block diagrams of portions of a system for implementing data transfer security mechanisms in accordance with embodiments of the present invention.
Figure 15:
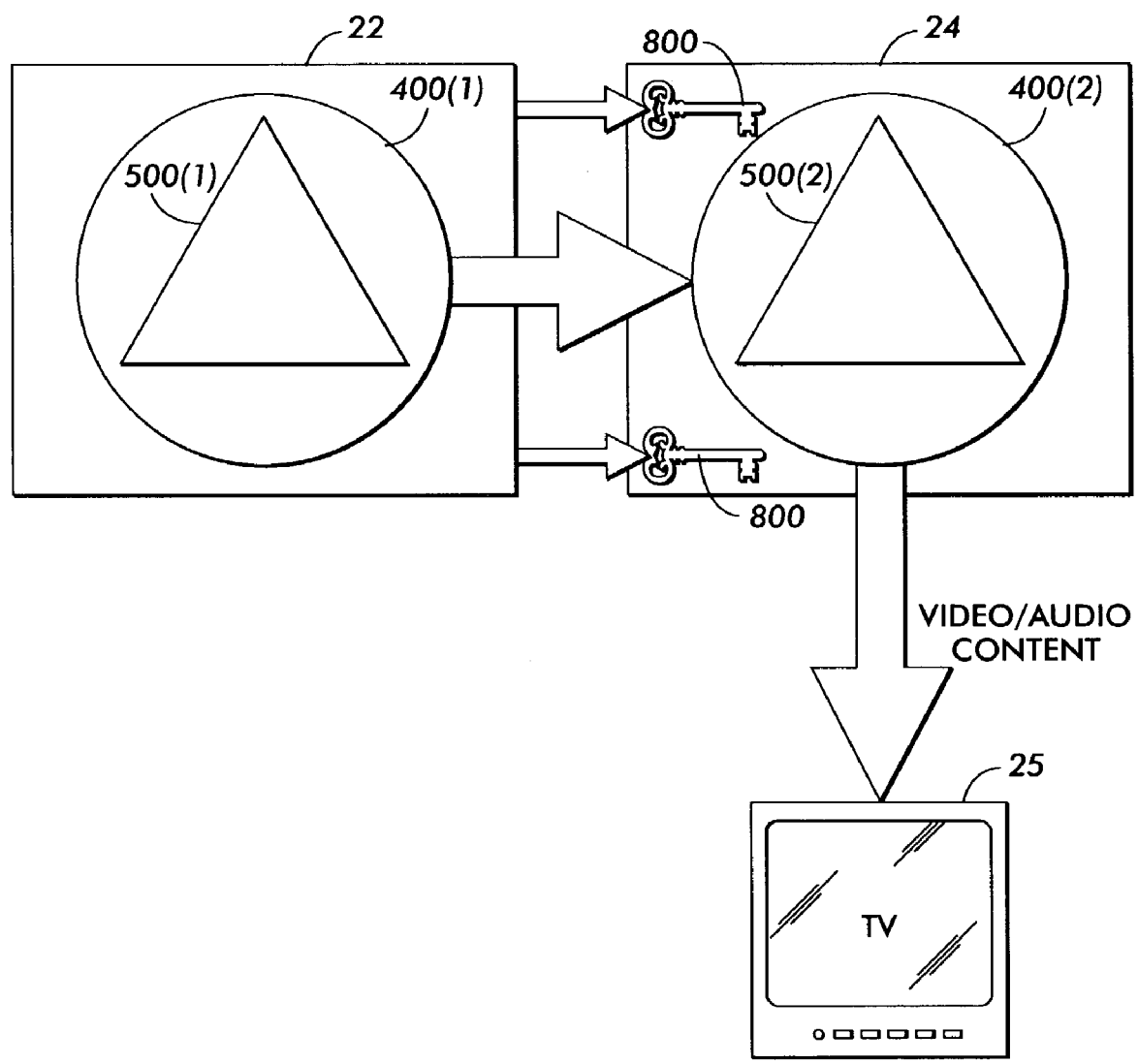

Furthermore, in this example, at step 400 an unsigned data type handler object 702(1) is used instead of the data type handler object 500(1) to create a signed data type handler object 703(1) as explained herein and shown in FIG. 14. The unsigned data type handler object 702(1) is the same as the data type handler object 500(1) described above.

Additionally, in this example a certificate granting system 20 creates a digital certificate 706(1) that conforms to the X.509 standard, which includes various types of information, such as system 20 identification information (e.g., name, serial number), expiration dates, a copy of the system 20's public key, and the digital signature of the system 20, although other types of certificates 706(1) can be used, such as XML, SPKI, WTLS and attribute certificates and other credentialing mechanisms may be used including shared secrets and keys between the computer 12 and the media player 18. The certificate granting system 20 provides the certificate 706(1) to the audio player 18, and the player 18 stores the certificate 706(1), shown as certificate 706(2), in a protected area of the audio player memory 62.

Referring to FIGS. 13-14, at step 710, the computer 12 requests the certificate granting system 20 to digitally sign the unsigned data type handler object 702(1), sending a copy of the object 702(1), shown as object 702(2) in FIG. 14, to the system 20, although again other credentialing mechanisms may be used, such as shared secrets and keys between the computer 12 and the media player 18. The certificate granting system 20 generates the cryptographic digital signature 704(1) for the object 702(2) with its private key using a signed Java code scheme, although other schemes may be used, such as MS Authenticode™, and creates the signed data type handler object 703(1) that includes the signature 704(1). The certificate granting system 20 sends the signed data type handler object 703(1) to the computer 12, shown as signed object 703(2), and the computer 12 associates the signed object 703(2) with the data transfer session object 400(1). Thereafter, the signed object 703(2) is provided to the audio player 18 in the same manner described above in connection with step 500.

At step 720, audio player 18 retrieves from the protected area of the audio player memory 62 the digital certificate 706(2). The audio player 18 verifies that the digital signature 704(3) in the signed data type handler object 703(3) is authentic using standard cryptographic techniques with the public key from the digital certificate 706(2) to verify that the signature 704(3) on the data type handler object 703(3) was computed by the holder of the corresponding private key, which is the certificate granting system 20 in this example, although the player 18 may confirm the authenticity of signature 704(3) by determining whether another trusted authority and/or one or more intermediaries computed the signature 704(3) employing standard certificate chaining techniques.

At step 730, the audio player 18 rejects the signed data type handler object 703(3) if it determines that the digital signature 704(3) included in the signed object 703(3) was not generated using the private key corresponding to the public key included in the digital certificate 706(2), although the player 18 rejects the signed object 703(3) if the signature 704(3) was not computed by another trusted authority and/or one or more intermediaries where standard certificate chaining techniques are employed. This allows the developer of the audio or media playing software executing on the audio player 18 to ensure that the player 18 only accepts and executes trusted, signed data type handler objects 703(3) to handle data not natively understood by the player 18. If the audio player 18 determines that the digital signature 704(3) in the signed data type handler object 703(3) is authentic, steps 600-630 are optionally performed in the same manner described above in connection with embodiments of the present invention.

An alternative process for the operation of the system 10 to implement an extensible digital rights management ("DRM") and/or a secure content delivery ("SCD") system in accordance with embodiments of the present invention will now be described with reference back to FIGS. 1-2, 5, 7, 10 and 13-14. In this example, and referring to FIG. 14, the signed objects 703(1)-703(3) are the same as described above in connection with other embodiments, except the signed objects 703(1)-703(3) also include instructions which when executed enables the recipient of the object 703(3), audio player 18 in this example, to be able to interpret rights expression language ("REL") statements, such as XrML™ statements, although other languages could be used and the unsigned data type handler objects 702(1)-702(2) may include the instructions that enable the audio player 18 to interpret REL statements. Further, the instructions in the object 703(3) force the component, player 18 in this example, to comply with the usage rights expressed by interpreted REL statements with respect to some content associated therewith.

Also in this example, the computer 12 has licensed content 708(1) that it may send to other components, such as the audio player 18, although other components may have the licensed content 708(1), such as the certificate granting system 20 and/or the content provider system 22. The licensed content 708(1) may be created initially by the computer 12, although other sources may create the licensed content 708(1) and send it to the computer 12, such as the certificate granting system 20 and/or the content provider system 22.

The licensed content 708(1) includes content, such as audio files, that is associated with a set of REL statements that expresses the usage rights for the licensed content 708(1), such as the number of times the content may be consumed and/or names of particular users who may consume the content, for example, although the content may be streaming audio. Additionally, in this example the licensed content 708(1) includes both the content and the REL statements together in one file, although the content may be stored in one file and the REL statements in another. Further, the licensed content 708(1) is structured in such a manner that the content included therein cannot be consumed without interpreting and complying with the usage rights expressed by the associated REL statements.

Steps 100-500 and 710-730 are performed as described above in connection with embodiments of the present invention, except as described herein, although steps 710-730 do not need to be performed as the operation described in this example may be performed after steps 100-500 are performed using the data type handler objects 500(1)-500(2). In either case, the computer 12 optionally encrypts the signed data type handler object 703(2), and hence the signed object 703(3), using an encryption key (not illustrated) corresponding to a decryption key (not illustrated) accessible to the audio player 18, although the computer 12 may encrypt the unsigned data type handler objects 702(1)-702(2).

The audio player 18 optionally stores within a protected area of the audio player memory 62 the corresponding decryption key (not illustrated) that the player 18 can use to decrypt the encrypted signed data type handler object 703 (3), although the player 18 may store a key capable of decrypting the unsigned objects 702(1)-702(2). This technique prevents an unauthorized listener from decrypting and using a copy of the signed data type handler object 703(2) as it is sent to the audio player 18 over the network 26. Such a mechanism can be used to restrict the use of signed data type handler objects 703(2) to authorized and trusted players 18 only.

Further, the computer 12 in this example sends a copy of the licensed content 708(1) to the audio player 18, which is shown as licensed content 708(2) in FIG. 14, although a number of other sources may send the licensed content 708(2) to the player 18, such as the certificate granting system 20 and the content provider system 22. In either case, the audio player 18 executes the instructions included in the signed data type handler object 703(3), which in turn interpret the REL statements and cause the player 18 to comply with the usage rights expressed by those statements in connection with the content included in the licensed content 708(2).

Thereafter, steps 600-630 are optionally performed as described above in connection with embodiments of the present invention. This mechanism enables components, such as the computer 12, to control the consumption of their content, such as the licensed content 708(1), so that only those components, such as the player 18, who are duly authorized can consume the content in a manner specified by the computer 12 or any other component or entity with an interest in the manner in which the content is consumed. Further, this mechanism enables components, such as the player 18, to be extended to understand new types of DRM systems, such as new types of RELs used in such new DRM systems, without reprogramming the components, in addition to optionally extending the components' capability in a dynamic manner to handle new types of data and/or content that they are not natively programmed to understand.

An alternative process for the operation of the system 10 to implement a data transfer security mechanism in accordance with embodiments of the present invention will now be described with reference to FIGS. 1, 6, 7, 13 and 15. Steps 100-500 are performed in the same manner described above in connection with embodiments of the present invention, except the content provider system 22 and the set-top box 24 are substituted for the computer 12 and the projector 14, respectively. Thus, the content provider system 22 and the set-top box 24 operate in place of the substituted computer 12 and projector 14, respectively, as described further herein. For ease of illustration and description, just one set-top box 24 is shown. In practice, the service (e.g., television broadcasts) provided by the content provider system 22 typically involves broadcasting encrypted video and/or audio content to a number of recipients, such as a plurality of set-top boxes 24, although the content may be sent to devices, such as TVs 25, directly.

Further, the data type handler objects 500(1) and 500(2) used in this example include additional instructions for participating in a broadcast keying protocol used by the content provider system 22 and for receiving encrypted video and audio content from the content provider system 22, although the instructions may enable the data type handler object 500(2) to participate in a multicast protocol. Further, the data type handler object 500(2) includes instructions for receiving and using broadcast keys 800 in conjunction with the broadcast keying protocol to decrypt the encrypted video and/or audio content sent from the content provider system 22.

As mentioned above, steps 100-500 are performed in the same manner described above in connection with other embodiments, except at step 500 in this example the content provider system 22 sends a data type handler object 500(2) to the set-top box 24, although other components may send the object 500(2) to the set-top box 24 or the object 500(2) may be pre-installed on the box 24 as described above in connection with embodiments of the present invention.

In this example, the content provider system 22 begins sending encrypted video and/or encrypted audio content to the set-top box 24 instead of sending MS PowerPoint™ files as described above in connection with one or more embodiments. While the encrypted video and/or encrypted audio is being sent by the content provider system 22, the system 22 broadcasts one or more broadcast keys 800 that the set-top box can receive and use in conjunction with the executed instructions in the data type handler object 500(2) to decrypt the content.

These broadcast keys 800 may be periodically broadcast from the content provider system 22 whenever the system 22 changes one or more cryptographic characteristics of the content, although the keys 800 may be periodically multicast from the content provider system 22. Thus, the set-top box 24 executes the instructions in the data type handler object 500(2) to receive and decrypt the content using the broadcast keys 800 as they are received and called for by the keying protocol embodied in the data type handler object 500(2).

Additionally, steps 600 and 710-730 are optionally performed by the set-top box 24 to handle content sent from the content provider system 22, which may not be natively understood by the set-top boxes 24, thereby extending the capabilities of the boxes 24 in a secure manner. Furthermore, the set-top box 24 processes the decrypted content received from the content provider system 22 and sends the content to the TV 25 for presentation by the TV 25. This arrangement allows the content provider system 22 to deliver encrypted content to trusted data type handler objects 500(2) executing on components, such as set-top boxes 24. Further, this mechanism allows the content provider system 22 to periodically change the cryptographic characteristics of the video and audio content it sends to increase security, and allows the system 22 to broadcast the new key information, such as the broadcast keys 800, to the trusted data type handler objects 500(2) that need it in order to decrypt the video and audio content.

Thus, embodiments of the present invention transparently and dynamically extend the behavior of components, such as the projector 14 in one of several examples, to allow the projector 14 to receive data, such as MS PowerPoint™ file data, transferred to it from another component, such as the computer 12, for example. Further, the embodiments of the present invention advantageously use the data type handler objects 500(2), which include mobile code, to interact with and process the MS PowerPoint™ data sent from the computer 12. Therefore, the components do not require explicit, prior programming to be able to handle data not natively known to the component, such as MS PowerPoint™ data or encrypted data.

As a result, compatibility of components, such as the computer 12, projector 14, PDA 16, audio player 18, content provider system 22 and set-top box 24, is no longer limited to the set of fixed data types each component is initially programmed to understand and that both components agree on. Furthermore, the mobile code associated with the data type handler objects 500(2) provides substantial benefits in that only a set amount of code needs to be provided for enabling the projector 14 to understand the MS PowerPoint™ data sent to it from the computer 12 in this example, rather than requiring that the entire MS PowerPoint™ program package be installed in the projector memory 42.

Further, the data type handler objects 500(2) can be encrypted and/or include cryptographic keys, and can include digital signatures 704(2) to implement an extensible DRM and/or SCD system. These techniques prevent unauthorized listeners from decrypting and using copies of signed data type handler objects 703(2) as they are sent over the network 26 to components, such as the audio player 18. Further, these mechanisms can be used to restrict the use of signed data type handler objects 703(2) to authorized and trusted players 18 only. Additionally, the embodiments of the present invention enable content provider systems 22 to deliver encrypted content to trusted data type handler objects 500(2) executing on components, such as set-top boxes 24. This allows content provider systems 22 to broadcast new key information to trusted data type handler objects 500(2) that need it in order to decrypt the video and audio content.

While particular embodiments have been described, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefor, is not intended to limit the claimed processes to any order except as may be specified in the claims.

What is claimed is:

1. A system comprising:
   a computer system coupled to a network;
   a first component coupled to the network; and
   a security system coupled to the network;
   wherein the computer system comprises:
      a discovery mechanism which
         discovers one or more components which are present on the network; and
         obtains one or more proxy objects from discovered components,
         wherein a proxy object for a component indicates types of data which the component can receive and understand and one or more data-type-handler interfaces which the component can accept and execute; and
   wherein the first component comprises an interface system that communicates with a data type handler object and accesses at least one interface provided by the data type handler object, wherein the data type handler object is a software object that includes mobile code for handling at least one type of data that otherwise cannot be read or understood by the first component, and wherein the interface system implements at least one data transfer security mechanism;
   wherein the security system accesses the interface provided by the data type handler object to obtain a data transfer security mechanism and implements the data transfer security mechanism; and
   wherein the data type handler object employed by the interface system on the first component is employed as a function of data type and security that is applied to the data type by the data transfer security mechanism.

2. The system as set forth in claim 1 wherein a portion of the data transfer security mechanism comprises cryptographic information and another portion of the data transfer security mechanism enables the first component to use the cryptographic information to decrypt encrypted content.

3. The system as set forth in claim 2 wherein the cryptographic information is modified by a second component in response to at least one encryption characteristic of the encrypted content being changed.

4. The system as set forth in claim 2 wherein the cryptographic information comprises at least one cryptographic key.

5. The system as set forth in claim 1 wherein the data transfer security mechanism instructs the first component to obtain cryptographic information from the first component or at least one other component.

6. The system as set forth in claim 1 wherein the data transfer security mechanism enables the first component to authenticate the data type handler-object.

7. The system as set forth in claim 6 wherein the first component has access to at least one of a digital certificate, a public key and a shared secret that the first component uses to authenticate the data type handler object, the shared secret being a set of information known by just the first component and another component.

8. The system as set forth in claim 1 wherein the first component has access to cryptographic information and the data transfer security mechanism requests at least one portion of the cryptographic information from the first component to enable the first component to decrypt portions of encrypted content using the requested cryptographic information.

9. The system as set forth in claim 8 wherein the cryptographic information further comprises at least one cryptographic key located at the first component or at one or more other components.

10. The system as set forth in claim 1 wherein the data type handler object is digitally signed with a cryptographic signature, wherein the first component rejects the data type handler object if the first component determines that the cryptographic signature was not created nor endorsed by a trusted source component.

11. The system as set forth in claim 1 wherein the data type handler object is encrypted using a first cryptographic key of the first component, wherein a second cryptographic key of the first component is used by the first component to decrypt the data type handler object, the second cryptographic key is stored at a secure location that is securely accessible to the first component.

12. The system as set forth in claim 1 wherein the data transfer security mechanism enables the first component to interpret at least one content rights expression language statement associated with content, wherein the data transfer security mechanism forces the first component to abide by the interpreted content rights expression language statement.

13. A method comprising:

providing a proxy object for a component in response to a discovery request sent by a computer system, wherein the proxy object indicates types of data which the component can receive and understand one or more data-type-handler interfaces which the component can accept and execute;

communicating with a data type handler object, wherein the data type handler object is a software object that includes mobile code for handling at least one type of data that otherwise cannot be read or understood by a first component, wherein the first component comprises an interface system, wherein the interface system communicates with the data-type-handler object and accesses at least one interface provided by the data-type-handler object, and wherein the interface system implements at least one data transfer security mechanism;

accessing at least one interface provided by the data type handler object to obtain a data transfer security mechanism; and implementing the data transfer security mechanism, wherein the data type handler object employed by the interface system on the first component is employed as a function of data type and security that is applied to the data type by the data transfer security mechanism.

14. The method as set forth in claim 13 wherein the implementing the data transfer security mechanism further comprises:

obtaining cryptographic information from the data transfer security mechanism; and decrypting encrypted content using the cryptographic information.

15. The method as set forth in claim 14 wherein the cryptographic information is modified by at least one component in response to at least one encryption characteristic of the encrypted content being changed.

16. The method as set forth in claim 14 wherein the cryptographic information comprises at least one cryptographic key.

17. The method as set forth in claim 13 wherein the implementing the data transfer security mechanism further comprises obtaining cryptographic information from a first component or at least one other component.

18. The method as set forth in claim 13 wherein the implementing the data transfer security mechanism further comprises authenticating the data type handler object.

19. The method as set forth in claim 18 wherein the authenticating the data type handler object further comprises using at least one of a digital certificate, a public key and a shared secret to perform the authenticating, the shared secret being a set of information known by just the first component and another component.

20. The method as set forth in claim 13 wherein the implementing the data transfer security mechanism further comprises:

requesting from a first component cryptographic information that is accessible to the first component; and decrypting portions of encrypted content using the requested cryptographic information.

21. The method as set forth in claim 20 wherein the cryptographic information further comprises at least one cryptographic key located at the first component or at one or more other components.

22. The method as set forth in claim 13 wherein the implementing the data transfer security mechanism further comprises rejecting the data type handler object if the first component determines that the data type handler object is not digitally signed with a cryptographic signature which was either created or endorsed by a trusted source component.

23. The method as set forth in claim 13 wherein the data type handler object is encrypted at a first component using a first cryptographic key of the first component, and wherein the implementing the data transfer security mechanism further comprises:

storing a second cryptographic key of the first component at a secure location that is securely accessible to a second component; and decrypting the data type handler object at the second component using the second cryptographic key of the first component.

24. The method as set forth in claim 13 wherein the implementing the data transfer security mechanism further comprises:

interpreting at a first component at least one content rights expression language statement associated with content; and forcing the first component to abide by the interpreted content rights expression language statement.

25. A computer-readable medium having stored thereon instructions, which when executed by at least one processor, causes the processor to perform:

providing a proxy object for a component in response to a discovery request sent by a computer system, wherein the proxy object indicates types of data which the component can receive and understand one or more data-type-handler interfaces which the component can accept and execute;

communicating with a data type handler object, wherein the data type handler object is a software object that includes mobile code for handling at least one type of data that otherwise cannot be read or understood by a first component, wherein the first component comprises an interface system, wherein the interface system communicates with the data-type-handler object and accesses at least one interface provided by the data-type-handler object, and wherein the interface system implements at least one data transfer security mechanism;

accessing at least one interface provided by the data type handler object to obtain a data transfer security mechanism; and implementing the data transfer security mechanism, wherein the data type handler object employed by the interface system on the first component is employed as a function of data type and security that is applied to the data type format by the data transfer security mechanism.

26. The medium as set forth in claim 25 wherein the implementing the data transfer security mechanism further comprises:

obtaining cryptographic information; and decrypting encrypted content using the cryptographic information.

27. The medium as set forth in claim 26 wherein the cryptographic information is modified by at least one component in response to at least one encryption characteristic of the encrypted content being changed.

28. The medium as set forth in claim 26 wherein the cryptographic information comprises at least one cryptographic key.

29. The medium as set forth in claim 25 wherein the implementing the data transfer security mechanism further comprises obtaining cryptographic information from a first component or at least one other component.

30. The medium as set forth in claim 25 wherein the implementing the data transfer security mechanism further comprises authenticating the data type handler object.

31. The medium as set forth in claim 30 wherein the authenticating the data type handler object further comprises using at least one of a digital certificate, a public key and a shared secret to perform the authenticating, the shared secret being a set of information known by just the first component and another component.

32. The medium as set forth in claim 25 wherein the implementing the data transfer security mechanism further comprises:
- requesting from a first component cryptographic information that is accessible to the first component; and
- decrypting portions of encrypted content using the requested cryptographic information.

33. The medium as set forth in claim 32 wherein the cryptographic information further comprises at least one cryptographic key located at the first component or at one or more other components.

34. The medium as set forth in claim 25 wherein the implementing the data transfer security mechanism further comprises rejecting the data type handler object if the first component determines that the data type handler object is not digitally signed with a cryptographic signature which was either created or endorsed by a trusted source component.

35. The medium as set forth in claim 25 wherein the data type handler object is encrypted at a first component using a first cryptographic key of the first component, and wherein the implementing the data transfer security mechanism further comprises:
- storing a second cryptographic key of the first component at a secure location that is securely accessible to a second component; and
- decrypting the data type handler object at the second component using the second cryptographic key of the first component.

36. The medium as set forth in claim 25 wherein the implementing the data transfer security mechanism further comprises:
- interpreting at a first component at least one content rights expression language statement associated with content; and
- forcing the first component to abide by the interpreted content rights expression language statement.

* * * * *

UNITED STATES PATENT AND TRADEMARK OFFICE
CERTIFICATE OF CORRECTION

PATENT NO. : 7,363,508 B2 Page 1 of 1
APPLICATION NO. : 10/442582
DATED : April 22, 2008
INVENTOR(S) : W. Keith Edwards et al.

It is certified that error appears in the above-identified patent and that said Letters Patent is hereby corrected as shown below:

On the title page, item (73) delete "Palo Alto Research Center Incorporated, Palo Alto, CA (US)" and insert --Xerox Corporation, Stamford, CT (US)--.

Signed and Sealed this

Fourth Day of November, 2008

JON W. DUDAS
*Director of the United States Patent and Trademark Office*